United States Patent [19]
Jamison et al.

[11] Patent Number: 5,504,767
[45] Date of Patent: Apr. 2, 1996

[54] DOPED DIAMOND LASER

[75] Inventors: Keith D. Jamison; Howard K. Schmidt, both of Houston, Tex.

[73] Assignee: SI Diamond Technology, Inc., Houston, Tex.

[21] Appl. No.: 406,306

[22] Filed: Mar. 17, 1995

[51] Int. Cl.$^6$ ........................................... H01S 3/16
[52] U.S. Cl. ..................... 372/41; 372/70; 372/42
[58] Field of Search ........................... 372/41, 69, 34, 372/42, 70, 103

[56] References Cited

U.S. PATENT DOCUMENTS

| | | | |
|---|---|---|---|
| 3,895,313 | 7/1975 | Seitz | 372/103 |
| 4,638,484 | 1/1987 | Rand et al. | 372/42 |
| 5,234,724 | 8/1993 | Schmidt . | |
| 5,354,584 | 10/1994 | Schmidt . | |
| 5,385,762 | 1/1995 | Prins . | |
| 5,420,879 | 5/1995 | Kawarada et al. | 372/41 |

OTHER PUBLICATIONS

Rand, S. C. and L. G. DeShazer, "Visible Color–center Laser in Diamond," *Optics Letters*, vol. 10, No. 10, Oct. 1985, pp. 481–483.

Weber, M. J., *Handbook of Laser Science and Technology, Supp. 1, Lasers*, CRC Press, 1991, pp. 4, 29, 30, 138.

*Primary Examiner*—Leon Scott, Jr.
*Attorney, Agent, or Firm*—Pravel, Hewitt, Kimball & Krieger

[57] ABSTRACT

A solid state laser is provided having as the laser medium diamond and an optically active dopant element which is found to lase in the solid matrix. The dopant is preferably titanium, vanadium, chromium, iron, cobalt, nickel, zinc, zirconium, niobium, cadmium, hafnium, tantalum, tungsten, rhenium, osmium, iridium, platinum, gold, mercury, cerium, praseodymium, neodymium, promethium, samarium, europium, gadolinium, terbium, dysprosium, holmium, erbium, thulium, ytterbium and uranium. Erbium is especially preferred. The laser medium is formed as dopants are added by ion implantation to a diamond crystal as the diamond is grown by chemical vapor deposition.

15 Claims, 2 Drawing Sheets

DOPED DIAMOND LASER

FIELD OF THE INVENTION

1. Field of the Invention

A solid state laser is provided. More particularly, a solid state laser having crystalline diamond as the host material, the diamond host crystal being doped with an active species, is provided. In a preferred embodiment, the active species is selected from the group consisting of titanium, vanadium, chromium, iron, cobalt, nickel, zinc, zirconium, niobium, cadmium, hafnium, tantalum, tungsten, rhenium, osmium, iridium, platinum, gold, mercury, cerium, praseodymium, neodymium, promethium, samarium, europium, gadolinium, terbium, dysprosium, holmium, erbium, thulium, ytterbium and uranium.

2. Description of Related Art

Lasers contain three elements: the laser medium, which generates the laser light; the power supply, which delivers energy to the laser medium in the form needed to excite it to emit light; and the optical cavity, or resonator, which concentrates the light to stimulate the emission of laser radiation.

A solid state laser is a laser in which the laser medium is a crystalline solid or a glass, called the host, which is doped with a species that can emit laser light. The active species is embedded in the host. The active species is excited to lase, or is pumped, by light from an external source. A variety of crystals and glasses have been shown to serve as hosts in the medium of a solid state laser. The main requirements of a host are transparency, ease of growth, and good heat transfer characteristics. Solid state lasers are described and data on some of the many combinations of materials used are provided in, for example, *The Laser Guidebook*, J. Hecht, McGraw-Hill, 1992, and in *Handbook of Laser Science and Technology, Supp. 1: Lasers*, by M. J. Weber, CRC Press, 1991.

Because diamond has extremely high thermal conductivity and a large band gap, it is of particular interest as a novel host for lasing ions to form a solid state laser. Diamond is about 200-times more resistant to thermal shock in high power optical systems than any other material, and therefore may provide a basis for producing extremely high power density solid state lasers. The high thermal conductivity of diamond will also minimize "thermal lensing," caused by a change in the index of refraction as the laser host material increases in temperature. This should allow the laser to operate at higher power densities than conventional solid state lasers.

The wide band gap of diamond (5.4 eV) allows higher energy photons to pass through the host crystal than traditional solid state laser hosts allow. This allows the possibility of forming a solid state laser from ions emitting shorter wave length radiation.

Most effort in diamond doping in the past has concentrated on modifying the electronic properties of diamond. Only boron and nitrogen can be substitutionally grown into the diamond lattice at low pressure. There has been some success with phosphorous. High energy ion implantation is an obvious next choice for selective doping of diamond. The implant process, however, normally causes lattice damage and amorphization of the crystal, and doping is limited to very near the surface of a crystal. The damage is not completely repairable, since the annealing temperature of diamond has been calculated to be above its graphite conversion temperature. Recently, a method of producing a doped diamond, typically a boron-doped diamond, was provided. (U.S. Pat. No. 5,385,762) The method involves multiple cold implantation and rapid annealing steps.

U.S. Pat. No. 5,234,724 provides a method of doping diamond as it is epitaxially grown by chemical vapor deposition on a substrate. In the method of this invention, the dopant is implanted in the film using a low energy ion beam. Implanted ions need only penetrate the diamond surface a few atomic layers so long as the implanted material is not substantially mobile in the diamond lattice at the growth temperature. The dopant may be any material that is capable of being ionized and has limited mobility in the diamond lattice at the growth temperature. The energy of the ion beam should be low enough that it does not create substantial damage to the lattice of the epilayer of diamond as it is being doped. By continuously doping the film during growth, one can produce a uniformly doped diamond film of arbitrary thickness.

A number of researchers have investigated diamond as a laser or optical amplifier medium using contaminants found in natural and high pressure synthetic diamonds, but uniformly metal-doped diamond has not been available. The use of natural color centers in diamond as a laser medium has been investigated. Laser action at 530 nm using H3 centers in diamond was observed by Rand and DeShazer (*Optics Letters*, Vol. 10, No. 10, Oct. 1985, p. 481–483).

There has long been a need for a solid state laser having doped diamond as the laser medium. The diamond will allow operation of a laser at higher power densities and shorter wave lengths than prior host materials allow.

SUMMARY OF THE INVENTION

According to one embodiment, there is provided a solid state laser having diamond as the host material and being doped with an optically active species. In a preferred embodiment, there is provided a solid state laser medium comprised of a diamond host doped with an element selected from among the following elements: titanium, vanadium, chromium, iron, cobalt, nickel, zinc, zirconium, niobium, cadmium, hafnium, tantalum, tungsten, rhenium, osmium, iridium, platinum, gold, mercury, cerium, praseodymium, neodymium, promethium, samarium, europium, gadolinium, terbium, dysprosium, holmium, erbium, thulium, ytterbium and uranium. In the most preferred embodiment, there is provided a solid state laser medium comprised of diamond doped with erbium.

DETAILED DESCRIPTION OF PREFERRED EMBODIMENT

The low energy ion implantation method described in U.S. Pat. No. 5,234,724 was used to dope the diamond films of this invention. This patent is incorporated by reference herein for all purposes.

Figure 1:
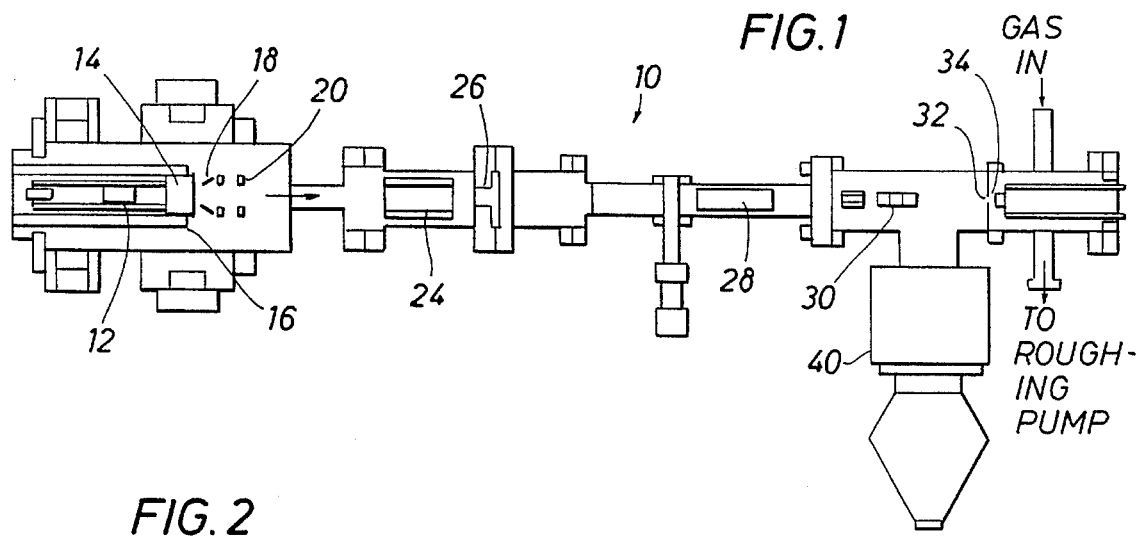
FIG. 1 is a schematic drawing of the apparatus used for ion implantation in diamond crystal during growth.

Referring to FIG. 1, apparatus 10, used to apply the method of U.S. Pat. No. 5,234,724, to form the laser medium of this invention using the method of this invention, is shown in FIG. 1. The ion source includes vaporizer 12, filament 14 and arc chamber (anode) 16. The ion source is preferably a Freeman ion source, but other ion sources well-known in the art may be used. The ion source preferably operates at a beam potential of about 10 KeV, but beam potentials in the range from about 5 KeV to about 12 KeV would be suitable. The Freeman ion source is simple in operation and well-known in industry. It is used in high-current ion implantation systems used, for example, in the production of semiconductors. Ions may be produced from either gas, vapor, from a liquid, or from sublimation of a solid. The gas is then ionized using a hot tungsten filament and the plasma is confined using a magnetic field. The ions are then extracted from this plasma using extractor 18 and electric ground 20, forming an ion beam. Once the ions leave the Freeman ion source, quadrupole 24 and steering plate 26 are used to steer the ion beam through the differential pumping region to eliminate background gases. The beam is subsequently mass filtered using Wein filter 28 to obtain the desired ion species. Next, the ion beam is focused by lens 30 and passes through differential pumping aperture 32 into the diamond growth chamber. The differential pumping aperture is used to isolate the diamond growth region, which is run at pressure of approximately 10 Torr, from the differential pumping area, which remains at a pressure of about $1\times10^{-5}$ Torr, as maintained by vacuum pumping apparatus 40.

Once in the growth chamber, collisions with the 10 Torr ambient gas present during diamond growth, which is about 99.5% hydrogen and 0.5% methane, decelerate, defocus and, to some extent, neutralize the ions until they strike the diamond sample located near the ion entrance aperture. The initial ion beam energy and the distance from the CVD growth chamber entrance aperture to the sample are chosen so that there is enough energy to bury the dopant atoms below the growth front but not enough to cause significant lattice damage. Therefore, the dopant atoms will be trapped in the diamond lattice and buried as more material is grown on top of them, creating a uniformly doped epitaxially grown layer. The thickness of this layer is determined by the time available for growth and the growth rate. Preferably, conditions in the diamond growth chamber are such that growth rates are greater than 1 micrometer/hour. This allows thicker doped films in a shorter period of time. Greater growth rates are obtained by increasing the deposition temperature, the system pressure and the reactant gas flow rates.

It is also important during growth of the crystal to minimize secondary nucleation on the single crystal diamond growth surface. Secondary nucleation hinders the optical transparency of the film and will degrade laser performance. Secondary nucleation may be reduced by improving the deposition process and cleaning the growth chamber between growth runs. Secondary deposition may also be kept down by careful cleaning of the diamond prior to the growth. A 3:1:1 mixture of nitric acid, sulfuric acid and 5% sodium hypochlorite can be used for cleaning the surface.

Typically, chlorides are used as the source material for the Freeman ion source. In some instances, such as with chromium as a dopant, solid chromium and carbon tetrachloride vapor were introduced into the ion source, wherein the carbon tetrachloride is cracked and the chlorine reacts with the chromium to form a vapor that is ionized to produce the beam. Any metals selected to determine their lasing properties in diamond may be introduced into growing diamond crystals by the methods described herein.

A large number of elements may be used in the diamond host crystal. The active species will be selected from among those species known to be optically active in solid hosts. These include titanium, vanadium, chromium, iron, cobalt, nickel, zinc, zirconium, niobium, cadmium, hafnium, tantalum, tungsten, rhenium, osmium, iridium, platinum, gold, mercury, cerium, praseodymium, neodymium, promethium, samarium, europium, gadolinium, terbium, dysprosium, holmium, erbium, thulium, ytterbium and uranium. Preferred are titanium, vanadium, chromium, iron, cobalt, nickel, cerium, praseodymium, neodymium, promethium, samarium, europium, gadolinium, terbium, dysprosium, holmium, erbium, thulium, ytterbium and uranium. Most preferred is erbium.

A typical growth run to dope a diamond host with a selected species uses the following procedure. A methane and hydrogen gas mixture is introduced into the growth chamber at a pressure of about 10 Torr. Next, the sample is heated to about 970° C. and tungsten filament 34 to about 2200° C., to start diamond growth. After filament 34 is carbonized and the growth parameters are fairly stable, the ion beam is introduced into the growth chamber to begin doping of the sample. A typical doping run to produce the samples described herein lasted about 12 hours. All samples grown were examined first using an optical microscope and a scanning electron microscope. Film thicknesses were determined using a DekTak profilometer. For each dopant, secondary ion mass spectroscopy (SIMS) was used to determine the doping level. Results of the SIMS data are summarized in Table 1.

TABLE 1

Dopant Concentration of Doped Diamond Samples from SIMS Measurements

| Dopant | Dopant Concentration (Atoms per cc) | Thickness (microns) |
|---|---|---|
| Titanium | $8 \times 10^{15}$ | 12 |
| Neodymium | $4 \times 10^{14}$ | 6 |
| Chromium | $1.2 \times 10^{16}$ | 14 |
| Erbium | $1 \times 10^{16}$ | 8 |

Dopant concentrations in the samples used were limited to about $10^{16}$ atoms per cc. Preferably, higher dopant concentrations are available. The limitation in the present samples was caused by the fact that the configuration for the Freeman source could not heat the material to be ionized to a high enough temperature to attain a high current. Preferably, higher current beams of the active species are obtained by a higher temperature Freeman ion source. Dopant concentrations up to about $10^{20}$ atoms per cc can be made available for a laser medium using the method of U.S. Pat. No. 5,234,724. For each element an optimum concentration range will exist, depending on the lasing characteristics of the element and on the effects of dopant concentration on crystal transparency.

To determine the energies that can be used for optical pumping of a laser, optical absorption by a doped diamond film is determined to identify energies where the material absorbs light. After the absorption measurements are made, the material is optically pumped at a suitable absorption wave length and fluorescence peaks in the material are identified. A long-lived fluorescence associated with an optical absorption peak of the optically active material is needed to create the population inversion necessary to construct a laser. The fluorescence peak identifies the region where lasing action is possible and the optical lifetime determines the chances of obtaining a population inversion at that fluorescence frequency. Optical absorption spectra of diamond doped by various optically active materials have been reported in the paper "Optical and Electrical Properties of Doped Diamond Films," by K. D. Jamison, R. P. Helmer and H. K. Schmidt, presented at the Second International Symposium on Diamond Materials, Minsk, Belarus, May 3-5, 1994.

The optical fluorescence of doped diamond samples was investigated by exciting them with light from either an excimer pumped dye laser, operating between 480 and 510 nanometers with a pulse rate of 10 Hz, or a krypton ion laser providing continuous illumination. Light coming from the sample was collected and transmitted to an optical multi-channel analyzer (OMA) consisting of a collection lens optically coupled to a monochromator where the light was separated by wave length and sent to a 1024-element diode array. The excitation wave lengths were generally shorter than the lower end of the spectral band. A long pass filter with a cutoff of 500 nanometers was placed in front of the collection optics in order to filter out the excitation radiation. The laser power varied between 6 microjoules per pulse to 30 microjoules per pulse.

All samples tested exhibited optical emission when suitably excited. However, to determine the change in luminescence obtained by doping of the diamond film, an undoped sample was always excited and analyzed under the same conditions as the doped film. Although absorption was measured with a copper-doped diamond sample, there were no interesting absorption features and no fluorescence measurements were made with copper. Titanium and chromium, being intermetallics or transition metals, were one group of materials tested and erbium and neodymium, being rare earths, formed a second group tested.

The most interesting results were seen from the erbium-doped material. When an erbium-doped film was excited with 485 nm light and viewed through a 580 nm long pass filter, we discovered that a very intense glow could be observed coming from the sample. An undoped film viewed under the same conditions exhibited no visible emission, although at longer wave lengths of 530 nanometers, a very dim glow could be detected from the undoped material.

Figure 2:
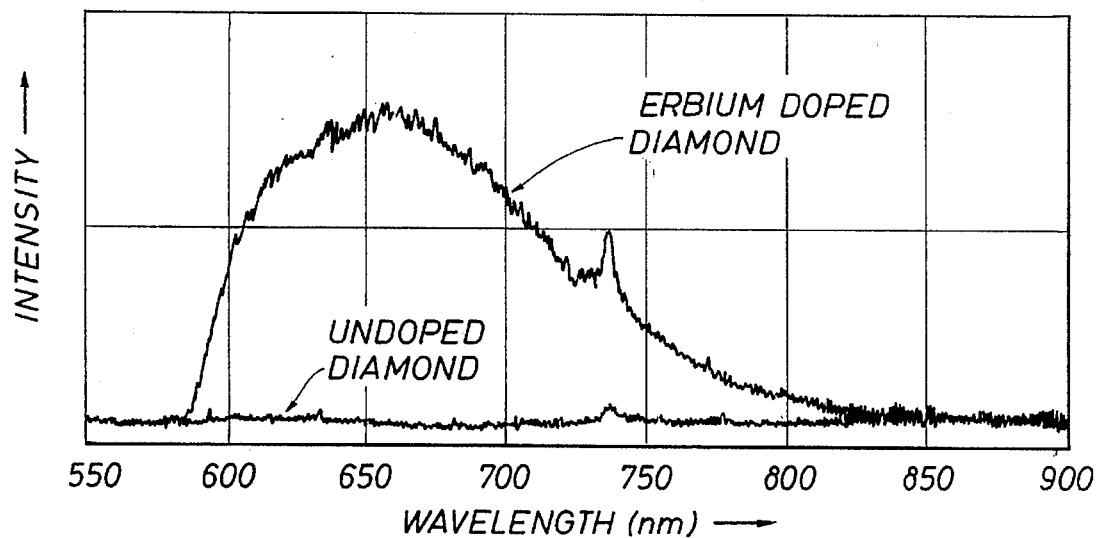
FIG. 2 is a graph of fluorescent emission intensity from an erbium-doped diamond film and an undoped diamond.

Spectral analysis of the emission from the erbium-doped film along with an undoped film was measured and is shown in FIG. 2. The spectrum consists of a broad band from 590 nm to 760 nm with a maximum at 650 nm. The higher intensity observed at 737 nm was most likely due to a defect center in the diamond. These data were collected using a 4 microsecond detection window where the detector window opened 1 microsecond before the start of the laser pulse.

Figure 3:
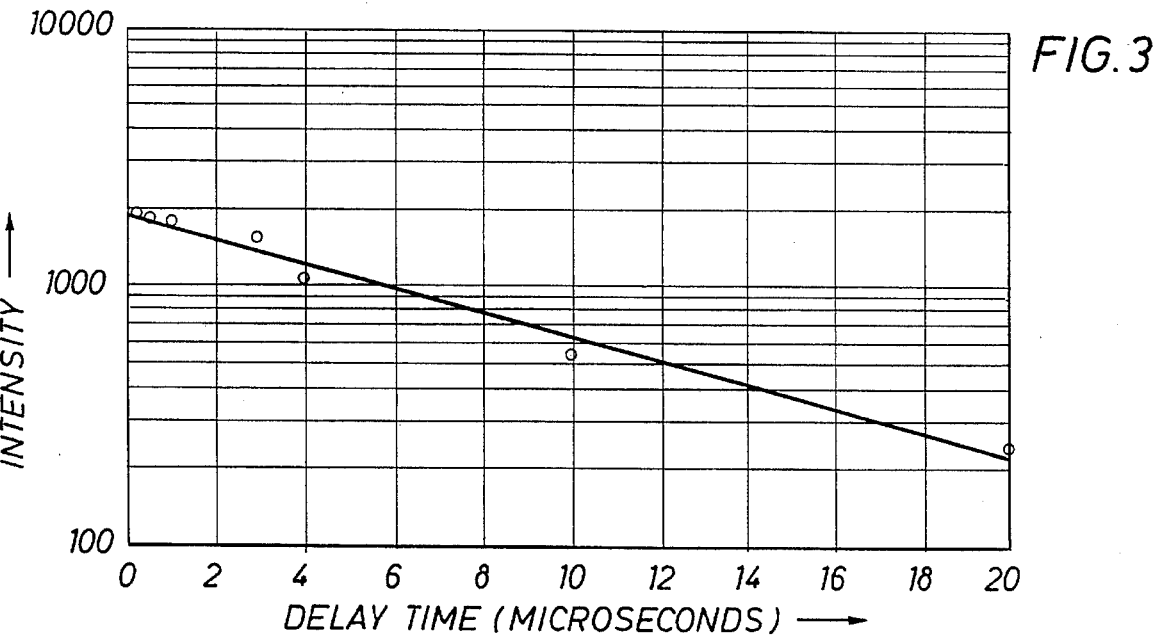
FIG. 3 is a plot of intensity versus delay time for the fluorescent decay of erbium-doped diamond.

In order to estimate the lifetime of the excited state, the phase relationship between the laser pulse and the window was altered. The detector window was adjusted to provide various time delays between zero and 20 microseconds from the 30 nanosecond wide laser pulse to the start of the detection window. The emissions spectra in the range from 595 to 765 nm was partitioned into 10 nm wide strips and the integrated emission as a function of time was computed for each strip. The time dependence for the strip centered at 670 nm is shown in FIG. 3 for longer time delays. Here the emission is plotted on a log scale so that exponential decay can be easily detected and the decay rate can be calculated. For time after 0.2 microseconds, the decay rate was measured to be 0.11 per microsecond, which corresponds to a half-life of about 6.5 microseconds. Similar computations were made for other strips in the emission band and, in general, observations were similar.

A neodymium-doped film was tested in the same manner as used for the erbium sample discussed above. The doped diamond sample showed a peak at 598 nm not seen in the undoped film, but data manipulation was necessary to bring out this peak. The optical multichannel analyzer available in these experiments was not sufficiently sensitive to detect radiation above about 900 nm wavelength.

Figure 4:
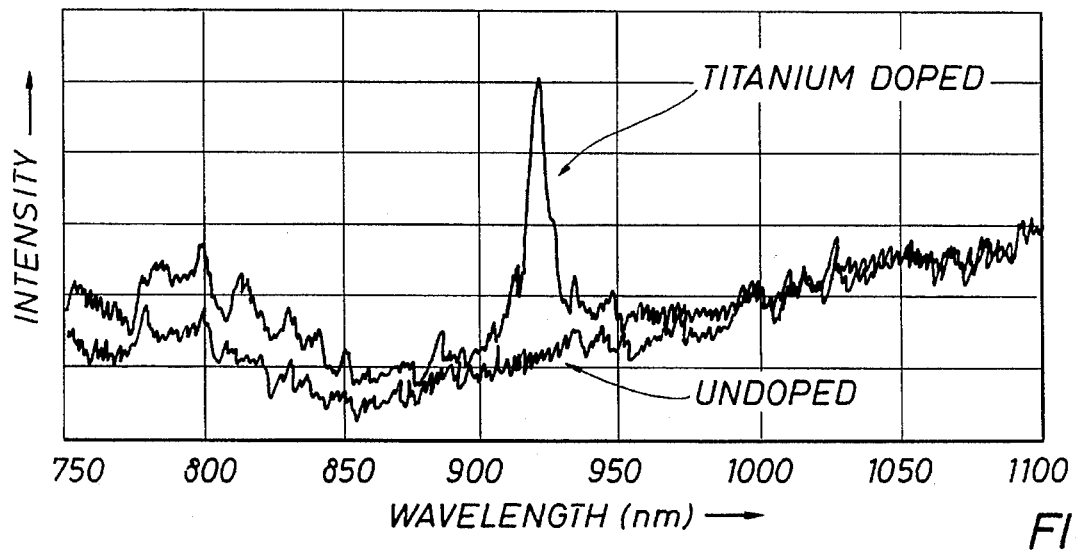
FIG. 4 is an emission spectrum of a titanium-doped diamond film and an undoped diamond.

The chromium-doped sample was also tested at an excitation wavelength of 485 nm and with a krypton laser at 530 nm. A peak was observed at 737 nm from fluorescence which was very intense. Chromium doping greatly increased the density of fluorescence at this wavelength. The titanium-doped sample also was illuminated with 485 nm light and it fluoresced strongly 921 nm. (FIG. 4) The titanium band is relatively narrow, whereas the emission from erbium, as shown in FIG. 2, occurs over a broad band.

Figure 5:
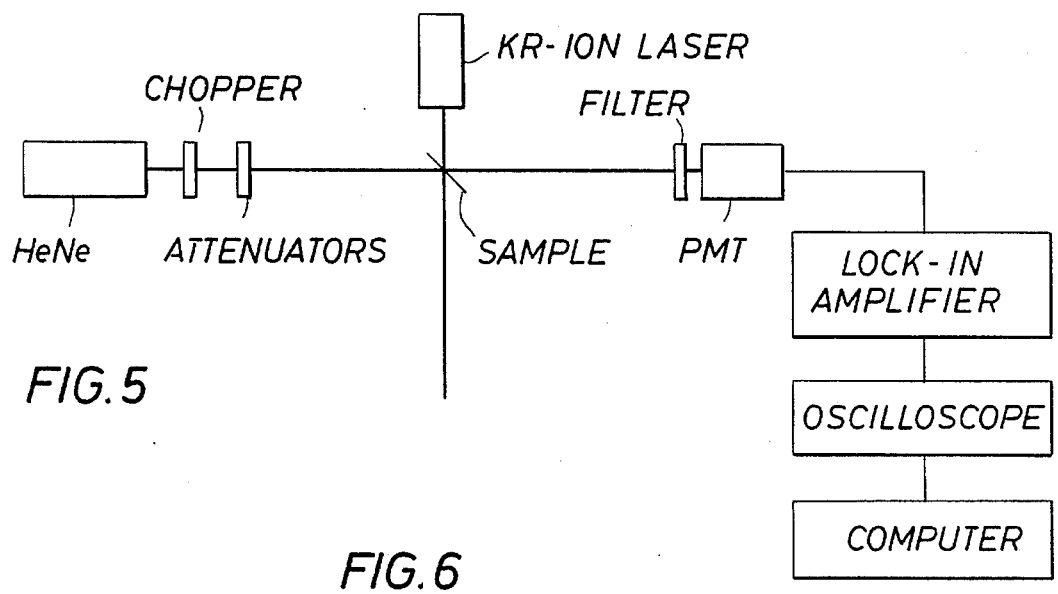
FIG. 5 is a sketch of the experimental setup for measurement of stimulated emission.
Figure 6:
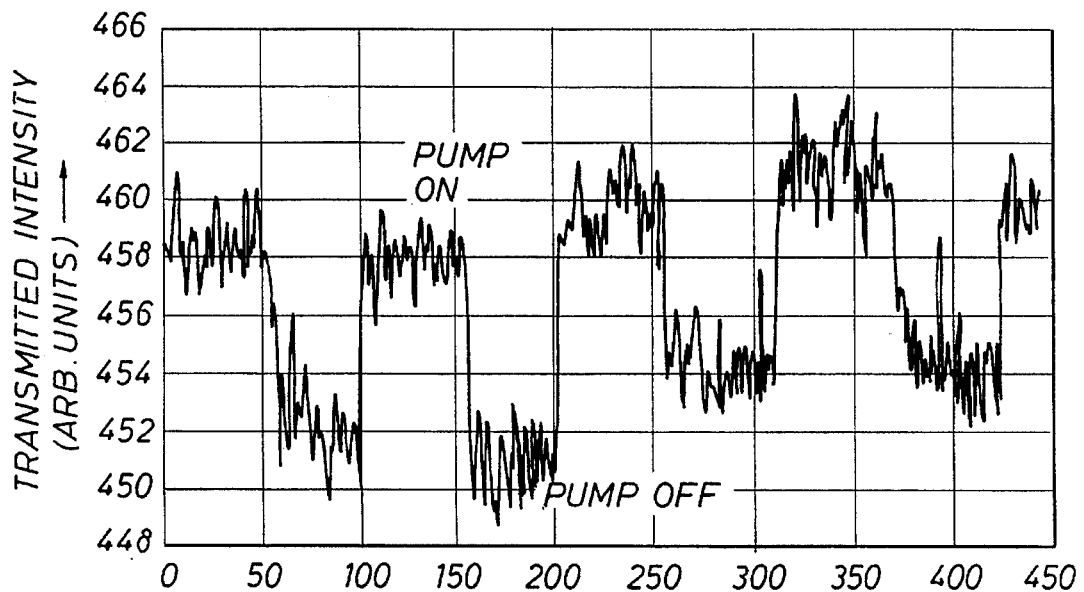
FIG. 6 is a graph of transmitted intensity at 622.8 nm with and without pumping of an erbium-doped single crystal diamond.

To demonstrate a doped diamond laser medium, measurements of stimulated emission from the erbium-doped sample were made. The experimental setup for these measurements is shown in FIG. 5. The laser beam from a helium-neon laser passes through a chopper, attenuators, the sample and a filter onto a detector (photomultiplier tube). The krypton-ion laser is on and off as intensity of the beam on the detector is measured. Results are shown in FIG. 6. FIG. 6 clearly shows an optical pump-dependent signal with the helium-neon probe laser passing through the sample, with the stimulated emission occurring when the optical pump is on. The optical gain is determined from measurements using the experimental setup of FIG. 5, using the equation $$I=I_0 \times e^{GL},$$

where I is the intensity of light out of the diamond crystal, $I_0$ is the intensity of light into the diamond crystal, G is the gain, and L is the thickness of the doped film. The optical gain measured for the erbium-doped film was 12 $cm^{-1}$. Stimulated emission with a gain of 12 $cm^{-1}$, long-lived optical fluorescence, such as demonstrated above, and optical clarity for diamond films grown by the method of U.S. Pat. No. 5,234,724, demonstrate that a solid state laser can be constructed from the erbium-doped diamond host as the laser medium. The book *Optical Electronics,* by Amnon Yariv, published by Holt, Rinehart and Winston, 1985, discusses the relationships between optical fluorescence, stimulated emission and lasing.

Other optically active materials such as those tested herein can also be used to produce solid state lasers by doping diamond with these materials. The titanium-doped film, for example, showed dopant-dependent fluorescence and would also be expected to exhibit lasing. Other materials will lase at different frequencies than those reported here, and the dopant can be selected to produce the frequencies of interest for a particular application of a laser. Because of the high thermal conductivity and high strength of diamond, materials which lase in the infrared, such as at wavelengths in the 2.0 to 2.4 micrometer wavelength range, can be developed. Because of the large band gap of the diamond host material, such that photons with energies less than 5.4 eV are not absorbed, other dopants can be used to produce lasers with shorter wavelengths, into the ultraviolet portion of the spectrum. A wide range of possible lasing frequencies that are of high commercial interest is available from use of selected species in the diamond host. Higher concentrations of dopant will allow higher gains than the 12 $cm^{-1}$ reported herein for erbium at a concentration of about $10^{16}$ atoms/cubic centimeter.

EXAMPLE

Squares of type IIA diamond with (100) orientation are placed in a chemical vapor deposition chamber such as illustrated in FIG. 1 and diamond film is grown at rates of about 5 micrometers per hour to produce a doped thickness of 0.1 millimeter in a growth run. During growth, the diamond is doped with a doping level of about $10^{18}$ atoms per cc. The dopant, chosen from the elements named herein is erbium. The diamond film is then placed in a laser cavity and pumped optically to produce a solid state laser.

It will be appreciated that while the present invention has been primarily described with regard to the foregoing embodiments, it should be understood that variations and modifications may be made in the embodiments described herein without departing from the broad inventive concept disclosed above or claimed hereafter.

What is claimed is:

1. A solid state laser comprising:
   a laser medium comprising diamond and a dopant selected from the group of elements consisting of titanium, vanadium, chromium, iron, cobalt, nickel, zinc, zirconium, niobium, cadmium, hafnium, tantalum, tungsten, rhenium, osmium, iridium, platinum, gold, mercury, cerium, praseodymium, neodymium, promethium, samarium, europium, gadolinium, terbium, dysprosium, holmium, erbium, thulium, ytterbium and uranium;
   a laser resonant cavity having energy extraction means; and
   means for optically pumping the laser medium.

2. The solid state laser of claim 1, wherein the laser medium is a uniformly doped epitaxially grown layer.

3. The solid state laser of claim 1, wherein the dopant is erbium.

4. The solid state laster of claim 3, wherein the laser medium uniformly doped epitaxially grown layer.

5. The solid state laser of claim 3, wherein the dopant is present at a concentration greater than about $10^{16}$ atoms per cubic centimeter.

6. The solid state laser of claim 1, wherein the dopant is present at a concentration greater than about $10^{16}$ atoms per cubic centimeter.

7. A solid state laser medium comprising diamond and a dopant selected from the group of elements consisting of titanium, vanadium, chromium, iron, cobalt, nickel, cerium, praseodymium, neodymium, promethium, samarium, europium, gadolinium, terbium, dysprosium, holmium, erbium, thulium, ytterbium and uranium.

8. The laser medium of claim 7, wherein the dopant is uniformly distributed through an epitaxially grown layer.

9. The laser medium of claim 7, wherein the dopant is erbium.

10. The laser medium of claim 7, wherein the dopant is present at a concentration greater than about $10^{16}$ atoms per cubic centimeter.

11. A method for forming a solid state laser medium comprising a diamond host crystal and a dopant, comprising the steps of:
    ionizing the dopant;
    forming an ion beam from the ionized dopant, the energy of the beam being selected to be high enough to implant the dopant in the diamond and low enough to avoid substantial lattice damage to the diamond, the geometry of the beam being formed to impact an area of the diamond; and
    impacting the ion beam onto the surface of the diamond while the diamond is growing by chemical vapor deposition.

12. The method of claim 11, wherein the dopant is selected to be trapped in the diamond lattice as the diamond is grown.

13. The method of claim 11, wherein the dopant is selected from the group group consisting of titanium, vanadium, chromium, iron, cobalt, nickel, cerium, praseodymium, neodymium, promethium, samarium, europium, gadolinium, terbium, dysprosium, holmium, erbium, thulium, ytterbium and uranium.

14. The method of claim 13, wherein the dopant is erbium.

15. The method of claim 11, wherein the ion beam current level is selected to form a dopant concentration greater than about $10^{16}$ atoms per cc.

* * * * *